United States Patent [19]

Hohol

[11] Patent Number: 4,783,969
[45] Date of Patent: Nov. 15, 1988

[54] CRYOGENIC WITHDRAWAL APPARATUS AND METHOD

[75] Inventor: Larry Hohol, Pittston, Pa.

[73] Assignee: Penox Technologies, Inc., Pittston, Pa.

[21] Appl. No.: 65,732

[22] Filed: Jun. 24, 1987

Related U.S. Application Data

[63] Continuation-in-part of Ser. No. 890,562, Jul. 30, 1986, abandoned.

[51] Int. Cl.⁴ ............................................... F17C 7/02
[52] U.S. Cl. ...................................... 62/52; 62/514 R
[58] Field of Search ........................... 62/50, 52, 514 R

[56] References Cited

U.S. PATENT DOCUMENTS

| | | | |
|---|---|---|---|
| 2,502,588 | 4/1945 | Preston et al. | 62/50 |
| 2,971,345 | 2/1961 | Ball | 62/53 |
| 3,201,946 | 8/1965 | Pauliukonis et al. | 62/45 |
| 3,216,209 | 11/1965 | Krigsman | 62/51 |
| 3,260,060 | 7/1966 | Pauliukonis et al. | 62/45 |
| 3,292,383 | 12/1966 | Charles et al. | 62/50 |
| 3,298,187 | 1/1967 | Short | 62/50 |
| 3,696,627 | 10/1972 | Longsworth | 62/51 |
| 4,317,269 | 3/1982 | Martin et al. | 29/157.3 R |

Primary Examiner—Ronald C. Capossela
Attorney, Agent, or Firm—Wegner & Bretschneider

[57] ABSTRACT

An apparatus and method for withdrawing cryogenic liquid from a vessel is disclosed. The apparatus includes a tube for withdrawing the cryogenic liquid from the vessel, a heating coil for gasifying the liquid that is withdrawn, and a heat exchanger, consisting of an inner and outer tube, that is connected to the heating coil and immersed in the cryogenic liquid. In operation, cryogenic liquid is withdrawn through the withdrawal tube and passed through the heating coil, where it is vaporized. The vapor that is produced passes through the outer tube of the heat exchanger, giving up heat to the cryogenic liquid in the vessel to thereby gasify a portion of it, to maintain head pressure within the vessel. The vapor then passes through the inner tube of the heat exchanger, and exits the apparatus.

6 Claims, 3 Drawing Sheets

CRYOGENIC WITHDRAWAL APPARATUS AND METHOD

This application is a continuation-in-part of U.S. Ser. No. 890,562 filed on July 30, 1986, now abandoned.

BACKGROUND OF THE INVENTION

Withdrawal and gasification of cryogenic liquids from cryogenic vessels are the subjects of a number of patents.

U.S. Pat. No. 2,971,345 (Ball) contemplates a device for withdrawing liquid butane from a vessel. The device includes a storage vessel, a vaporizer and a pump. In operation, a portion of the butane withdrawn from the vessel is vaporized and subsequently recycled to the vessel. Another portion on the butane is sent to a receiving means.

U.S. Pat. No. 3,216,209 (Krigsman) is directed to an apparatus for maintaining a fluid in a supercritical state. The apparatus is provided with a heating coil within a storage vessel and a heating coil external to the storage vessel. Fluid that is withdrawn from the storage vessel flows through the heating coils to maintain it in a supercritical state.

U.S. Pat. No. 3,696,627 (Longsworth) discloses a system for transferring a liquefied gas at a constant temperature, pressure and flow rate. The system consists of three nested tubes. The innermost tube withdraws the liquefied gas. The middle tube subcools the liquefied gas in the inner tube and the outermost tube absorbs heat from the surrounding atmosphere through a jacketing fluid.

U.S. Pat. No. 4,317,269 (Martin et al.) discloses a device for revaporizing a liquefied gas that is stored in an insulated vessel. The device includes a series of nested tubes through which water flows. As the liquefied gas contacts the nested tubes, it is vaporized.

A significant disadvantage of prior systems for withdrawing and gasifying cryogenic liquids has been that the withdrawal rate is impeded or even stopped when the pressure of the gas in the head space above the liquid in the insulated vessel is lowered because the liquid is withdrawn faster than it can vaporize within the vessel and replenish the head pressure.

SUMMARY OF THE INVENTION

This invention concerns a method and apparatus for withdrawing or gasifying a cryogenic liquid from an insulated vessel. The apparatus comprises a withdrawal tube and a heat exchanger set so that when the tube and heat exchanger are brought into sealing engagement with the vessel, the withdrawal tube and heat exchanger are immersed in the liquid in the vessel. The heat exchanger preferably consists of an inner tube nested within, and connected to an outer tube. In a preferred embodiment, the withdrawal tube is nested within the inner tube such that the withdrawal tube, inner tube and outer tube are concentric.

Among the cryogenic liquids suitable for use in the withdrawal device I have invented are $CO_2$, argon, oxygen, nitrogen, helium, hydrogen, ammonia, methane, carbon monoxide, nitrous oxide, ethylene and ethane. Although most of the uses I contemplate for my invention relate to the health care and food industries, e.g., oxygen supply units for persons needing oxygen to breathe and $CO_2$ supply apparatus, my invention can be used on an industrial scale as well.

In addition, there are gasifying means located either inside or outside the vessel for gasifying the cryogenic liquid withdrawn from the vessel which are so connected with the outer and inner tubes of the heater exchanger that the gas produced in the gasifying means passes first through the outer tube, giving up some of its heat to the liquid within the vessel, and then through the inner tube and out of the device, where it can be heated further for its end use or used as it is for the usual application to which the gas is put. The cryogenic liquid not passed through the gasifying means may be used in its liquid form or converted into a gas in means not disclosed in this application.

In other embodiments of my invention the device also includes that is known as an "economizer circuit", which comprises means for withdrawing gas directly from the portion of the interior of the vessel above the surface of the cryogenic liquid therein and a back pressure regulation means capable of being set at a predetermined pressure level connected with the means for withdrawing gas directly from the interior of the vessel. Gas is withdrawn directly from the head space above the surface of the liquid within the vessel when the pressure of the gas in the head space exceeds the predetermined pressure, thus reducing or eliminating the risk of vessel rupture or excessive flow when the pressure within the vessel gets too high. Once the pressure in the head space returns to a point below the predetermined pressure, the back pressure regulator is reset to permit use of gas withdrawn through the inner tube.

In operation, when the valve is opened to withdraw gas for use, as in pressurizing beer or soft drink dispensing equipment, the natural flow of gas produced by expansion of the gas from the liquid to the vapor state causes gas to flow from the device. Thus, no pump is needed in connection with the device I have invented, and various rates of flow can be achieved by varying the preset pressure of the back pressure regulator.

The device I have invented has several advantages over previous device for withdrawing cryogenic liquids and converting it into a gas. Because the head pressure is constantly maintained by the transmission of heat into the liquid from the gas passing through the outer tube, the rate of liquid withdrawal can be maintained at a very high level without having to stop the withdrawal or reduce the rate of withdrawal to allow the head pressure to build back up to an acceptable level. As the rate of withdrawal increases, the amount of heat exchange also increases, thus building head pressure at a rate sufficient to maintain adequate operating pressure. The design of the device allows it to be used with vessels having narrow as well as wide openings, which is a significant advantage over presently available-pressure building units those physical size are suitable only for use in vessels with wide openings.

These and other advantages will be apparent to persons skilled in the art from the drawings and specification hereof.

DETAILED DESCRIPTION OF THE INVENTION

Figure 1:
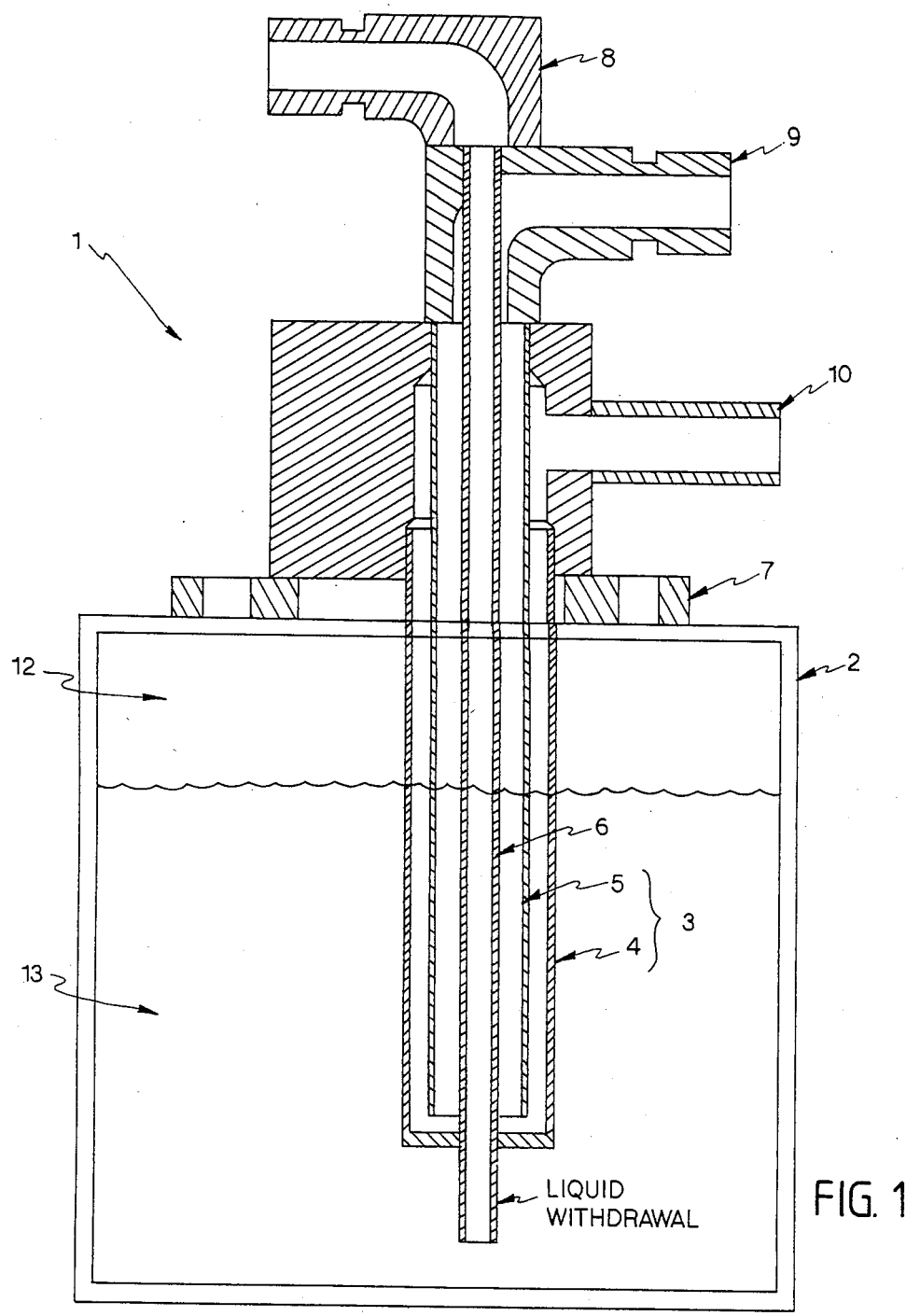
FIG. 1 shows a withdrawal device having a withdrawal tube nested within the heat exchanger tubes.

Shown in FIG. 1 are various major features of the invention. The liquefied gas withdrawal system is generally referred to as 1. A representative insulated vessel, that is capable of storing a liquefied gas for an extended period of time is designated 2. The vessel 2 may be, for example, a dewar flask or other suitable cryogenic storage vessel. A heat exchanger is labelled 3. A withdrawal tube for withdrawing liquefied gas is labelled 6.

Withdrawal system 1 is composed of a withdrawal tube 5 and a heat exchange 3 having two nested tubes. As shown in FIG. 1, an inner tube 5 is nested within and connected at one end to an outer tube 4, such that gas produced by vaporization of the liquefied gas from the vessel which enters the heat exchanger through outer tube 4 will exit the heat exchanger through inner tube 5. Withdrawal tube 6 and heat exchanger 3 can be fabricated from any heat-conductive material that is suitable for cryogenic applications, although stainless steels is the most suitable material. Withdrawal tube 6 and heat exchanger 3 are set within a mount 7. Mount 7 serves to maintain fixedly in place withdrawal tube 6 and heat exchanger 3, while at the same time, mount 7 serves to engage vessel 2 to form a vapor tight seal. Mount 7 can be fabricated from any material suitable for cryogenic applications and can have applied to its bottom a type of rubber material for facilitating making a vapor tight seal.

Withdrawal system 1 can further include fixtures 8, 9 and 10, which attach to withdrawal tube 6, inner tube 5 and outer tube 4, respectively. Fixtures 8, 9, and 10 serve to facilitate connection of withdrawal system 1 to various devices for storing and using the withdrawal liquid and for supplying gas to heat exchanger 3.

FIG. 1 also shows a preferred embodiment of the invention in which withdrawal tube 6 is located within and concentric with inner tube 4. One advantage of this configuration is that the withdrawal system of FIG. 1 will fit inside insulated vessels having narrow openings.

Figure 2:
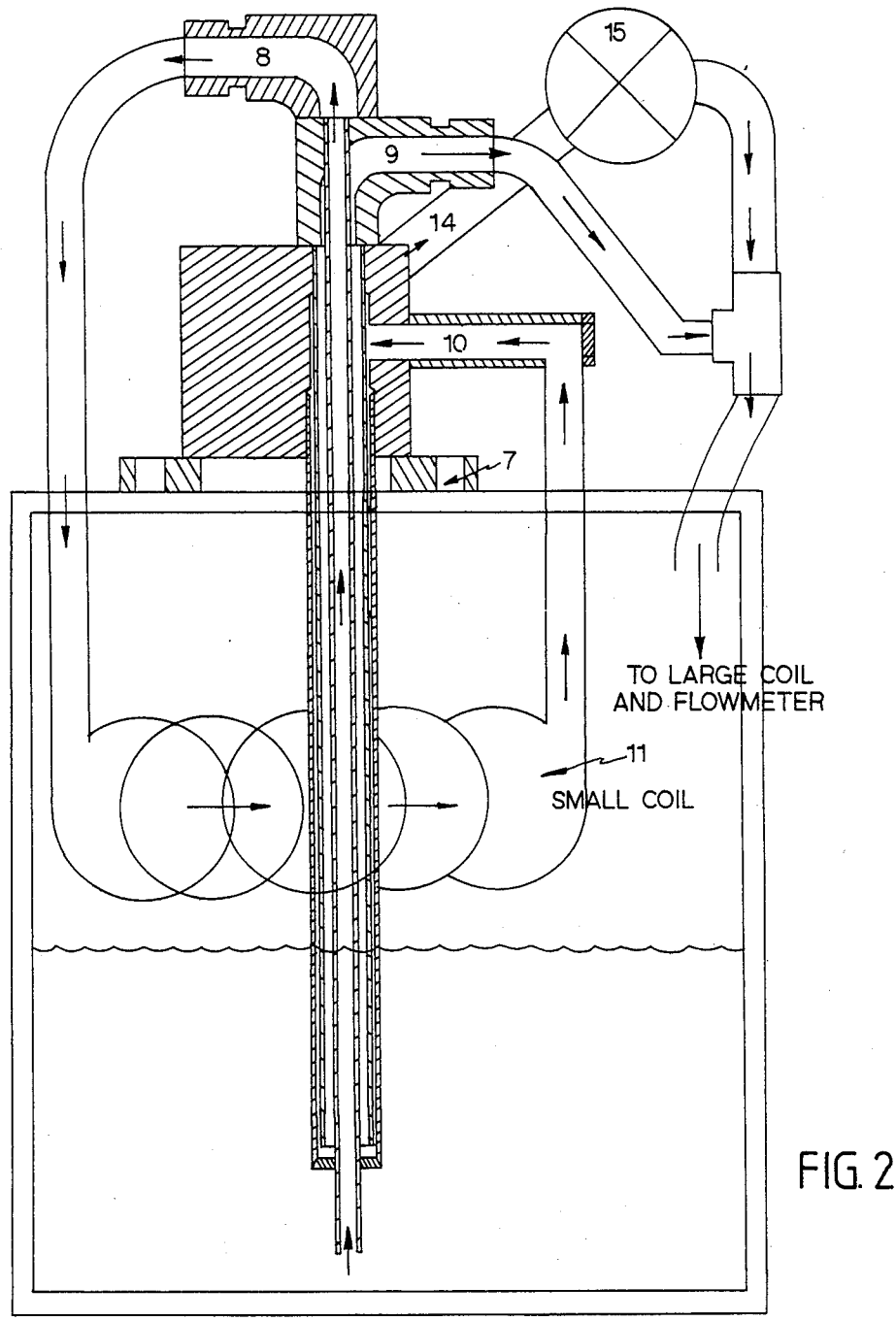
FIG. 2 shows a withdrawal device further including the external gasifying means.
Figure 3:
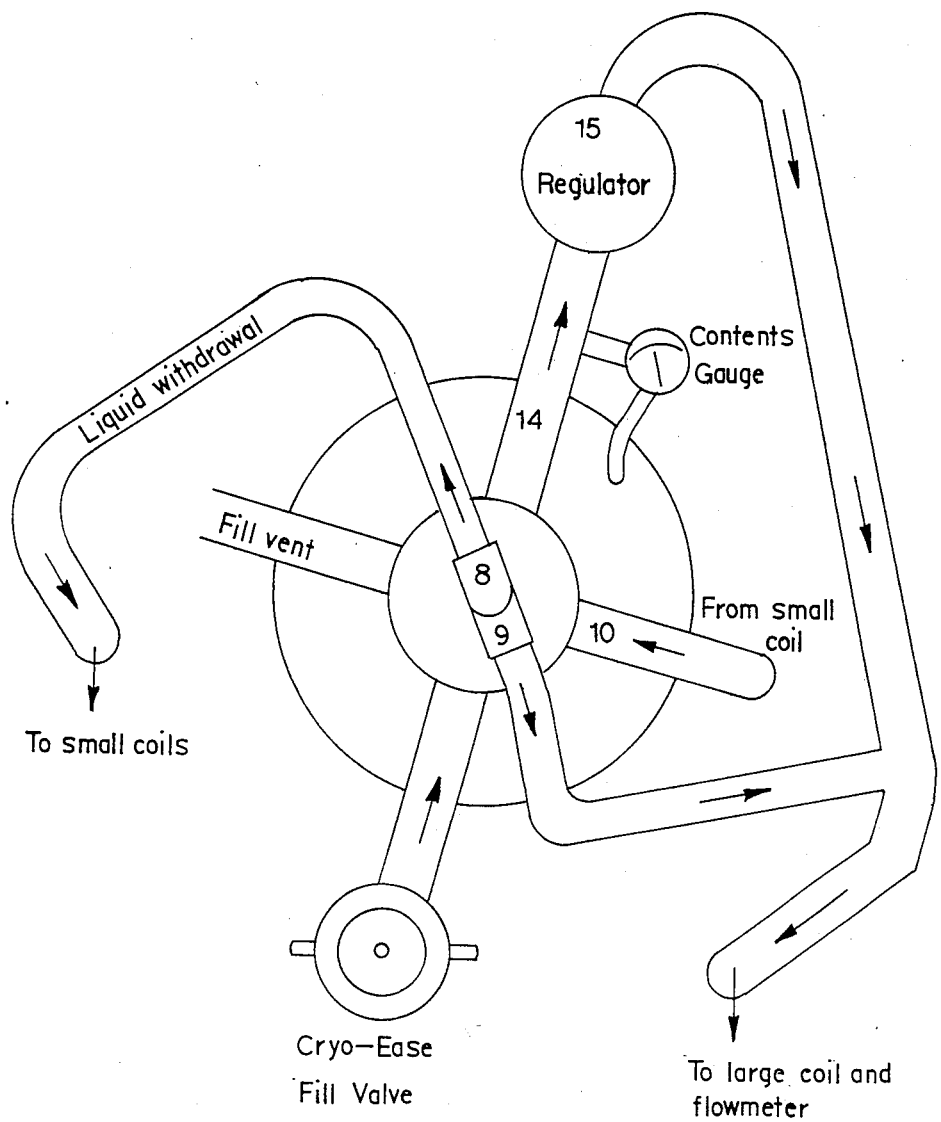
FIG. 3 is a schematic top view of a withdrawal device in accordance with this invention.

FIG. 2 illustrates an embodiment of the instant invention which further includes gasifying means 11, which may be a conventional heating coil or heat exchanger connected in series with inner tube 5 and outer tube 4 and withdrawal tube 6 to form a loop. The preferred method uses the ambient air to provide heat to the heating coil to warm the liquid to convert it to gas, which is then warmed to as close to room temperature as possible. The mount 7 may also be penetrated with a fixture 14, to which is connected a conventional back pressure regulator, which is also connected with fixture 9, from which gas exits the heat exchanger. Gas then exits the back pressure regulator through fixture 16, which is connected to the end use system.

The operation of the withdrawal system will now be described. Referring to FIG. 2, the liquified gas is indicated as 13. The head space in the vessel above the liquefied gas is designated 12. As liquefied gas 13 is withdrawn from vessel 2, head space 12 increases in size. As a result, the pressure within the vessel decreases, thereby slowing the rate at which liquefied gas 13 is withdrawn. To facilitate withdrawal of liquefied gas 13, gas from the gasifying means 11 is circulated through heat exchanger 3 to gasify liquefied gas 13. The gasified liquid increases pressure within the vessel such that liquefied gas is more readily withdrawn through withdrawal tube 6.

The heat exchanger works as follows. Heating coil 11 heats a portion of the liquid drawn through withdrawal tube 6 to a temperature sufficient to vaporize the liquid. The gas then enters the heat exchanger through fixture 10. Once inside heat exchanger 3, the gas releases its heat through the outside wall of outer tube 4, thereby partially gasifying liquefied gas 13. In the process of giving up heat, the gas cools and is then withdrawn from the heat exchanger through inner tube 5 and finally exits the heat exchanger through fixture 9.

Nesting withdrawal tube 6 within inner tube 5 accrues a further advantage, in addition to rendering the withdrawal system more compact. As previously stated, as the heat exchange fluid gives up heat to liquefied gas 13, it in turn is cooled. The cooled heat exchange fluid flowing through inner tube 5 surrounds the liquid that is withdrawn through the withdrawal tube, thereby helping to maintain cryogenic liquid 13 in its liquid state.

I claim:

1. A device adapted to sealingly engage with the neck of an insulated vessel containing a cryogenic liquid for withdrawing the liquid from the vessel, comprising:
    (a) a withdrawal tube adapted to extend into the liquid for withdrawing the liquid from the vessel;
    (b) a heat exchanger disposed about the withdrawal tube and adapted to be immersed in the liquid, comprising an outer tube and an inner tube nested within the outer tube and connected therewith; and
    (c) gasifying means for gasifying the liquid withdrawn from the vessel,
   wherein the withdrawal tube, the outer and inner tubes in the heat exchanger and the gasifying means are so connected that the gas produced in the gasifying means passes first through the outer tube, then through the inner tube and then to the exterior of the device or back to the gasifying means.

2. The device of claim 1, wherein the withdrawal tube, the outer tube and the inner tube are substantially concentric.

3. The device of claim 1, further comprising means for withdrawing gas directly from a space in the interior of the vessel above the surface of the liquid therein and a back pressure regulation means capable of being set at a predetermined pressure level connected with the means for withdrawing gas directly from the interior of the vessel, such that gas is withdrawn directly from the space above the surface of the liquid within the vessel when the pressure of the gas coming out the inner tube to the exterior of the device exceeds the predetermined pressure.

4. A method for withdrawing cryogenic liquid from an insulated vessel comprising:
    (a) sealingly engaging the neck of the vessel with a device comprising:
        (i) a withdrawal tube adapted to extend into the liquid, for withdrawing the liquid from the vessel;
        (ii) a heat exchanger disposed about the withdrawal tube and adapted to be immersed in the liquid, comprising an outer tube and an inner tube nested within the outer tube and connected therewith;
        (iii) a gasifying means for gasifying the liquid withdrawn from the vessel;
    (b) withdrawing liquid through the withdrawal tube;
    (c) flowing at least a portion of the withdrawn liquid through the gasifying means to form a gas;

(d) flowing the gas through the outer tube of the heat exchanger to gasify a portion of the liquid in the vessel, thereby increasing pressure within the vessel and cooling the gas in the outer tube;

(e) flowing the cooled gas through the inner tube and then to the exterior of the device or back to the gasifying means.

5. The method of claim 4 wherein the withdrawal tube, the outer tube and inner tube of the device are substantially concentric.

6. The method of claim 4 wherein the device further comprises:

(iv) means for withdrawing gas directly from the portion of the interior of the vessel above the surface of the liquid therein;

(v) back pressure regulation means capable of being set at a predetermined pressure level and connected with both the inner tube and the means for withdrawing gas directly from the interior of the vessel, wherein gas is withdrawn directly from the space above the surface of the liquid within the vessel when the pressure of the gas exceeds the predetermined pressure.

* * * * *